US012364285B2

(12) United States Patent
Kim et al.

(10) Patent No.: US 12,364,285 B2
(45) Date of Patent: Jul. 22, 2025

(54) AEROSOL GENERATING DEVICE

(71) Applicant: KT&G CORPORATION, Daejeon (KR)

(72) Inventors: Yong Hwan Kim, Gyeonggi-do (KR); Sung Wook Yoon, Gyeonggi-do (KR); Seung Won Lee, Gyeonggi-do (KR); Dae Nam Han, Seoul (KR)

(73) Assignee: KT&G CORPORATION, Daejeon (KR)

( * ) Notice: Subject to any disclaimer, the term of this patent is extended or adjusted under 35 U.S.C. 154(b) by 447 days.

(21) Appl. No.: 17/910,192

(22) PCT Filed: Apr. 27, 2021

(86) PCT No.: PCT/KR2021/005302
§ 371 (c)(1),
(2) Date: Sep. 8, 2022

(87) PCT Pub. No.: WO2021/246644
PCT Pub. Date: Dec. 9, 2021

(65) Prior Publication Data

US 2023/0099721 A1 Mar. 30, 2023

(30) Foreign Application Priority Data

Jun. 3, 2020 (KR) ........................ 10-2020-0067172

(51) Int. Cl.
*A24F 13/00* (2006.01)
*A24F 40/20* (2020.01)
(Continued)

(52) U.S. Cl.
CPC ............ *A24F 40/465* (2020.01); *A24F 40/20* (2020.01); *A24F 40/51* (2020.01); *A24F 40/53* (2020.01); *H05B 6/105* (2013.01)

(58) Field of Classification Search
CPC ...................................................... A24F 47/00
(Continued)

(56) References Cited

U.S. PATENT DOCUMENTS 11,172,704 B2 11/2021 Hon
2018/0049469 A1 2/2018 Kaufman et al.
(Continued)

FOREIGN PATENT DOCUMENTS

EP 2 399 636 A1 12/2011
JP 2017-510270 A 4/2017
(Continued)

OTHER PUBLICATIONS

Communication dated Oct. 24, 2023 issued by the Japanese Intellectual Property Office in Japanese Application No. 2022-554680.
(Continued)

*Primary Examiner* — Phuong K Dinh
(74) *Attorney, Agent, or Firm* — Sughrue Mion, PLLC

(57) ABSTRACT

An aerosol generating device includes a heater configured to heat a cigarette to generate an aerosol, an inductance channel, a capacitance channel, and a controller configured to generate a control signal using information received from the inductance channel and the capacitance channel. A cigarette insertion space that is configured to receive the cigarette is provided within the aerosol generating device, and the controller is configured to: measure an amount of change in capacitance in the capacitance channel based on an amount of change in frequency of current flowing through the inductance channel exceeding a first reference value, due to an object adjacent to the cigarette insertion space, and control a start of a supply of power to the heater based on the amount of change in the capacitance that is measured exceeding a second reference value.

15 Claims, 7 Drawing Sheets

(51) Int. Cl.

| | |
|---|---|
| ***A24F 40/465*** | (2020.01) |
| ***A24F 40/51*** | (2020.01) |
| ***A24F 40/53*** | (2020.01) |
| ***H05B 6/10*** | (2006.01) |

(58) Field of Classification Search
USPC .................................................. 131/328–329
See application file for complete search history.

(56) References Cited

U.S. PATENT DOCUMENTS

| | | | |
|---|---|---|---|
| 2018/0310622 A1* | 11/2018 | Mironov ................. A24F 40/50 |
| 2019/0159517 A1 | 5/2019 | Ballesteros Gomez et al. |
| 2020/0260790 A1 | 8/2020 | Kaufman et al. |
| 2021/0007393 A1 | 1/2021 | Jung et al. |
| 2021/0120875 A1 | 4/2021 | Mironov |
| 2022/0125112 A1 | 4/2022 | Zuber et al. |

FOREIGN PATENT DOCUMENTS

| | | | |
|---|---|---|---|
| JP | 2019-526237 | A | 9/2019 |
| KR | 10-2012-0002555 | A | 1/2012 |
| KR | 10-2016-0124853 | A | 10/2016 |
| KR | 10-2017-0007262 | A | 1/2017 |
| KR | 10-1971169 | B1 | 4/2019 |
| KR | 10-2019-0075181 | A | 6/2019 |
| KR | 10-2020-0061233 | A | 6/2020 |
| WO | 2019/129866 | A1 | 7/2019 |
| WO | 2019/185746 | A1 | 10/2019 |
| WO | 2019/197170 | A1 | 10/2019 |
| WO | 2020/043901 | A1 | 3/2020 |
| WO | 2020-105896 | A1 | 5/2020 |

OTHER PUBLICATIONS

Extended European Search Report dated Jul. 14, 2023 in Application No. 21817521.4.
International Search Report for PCT/KR2021/005302 dated Sep. 7, 2021.
Written Opinion for PCT/KR2021/005302 dated Sep. 7, 2021.
Korean Non-Final Office Action for Korean Application No. 10-2020-0067172 dated Jan. 10, 2022.

* cited by examiner

[Fig. 3]
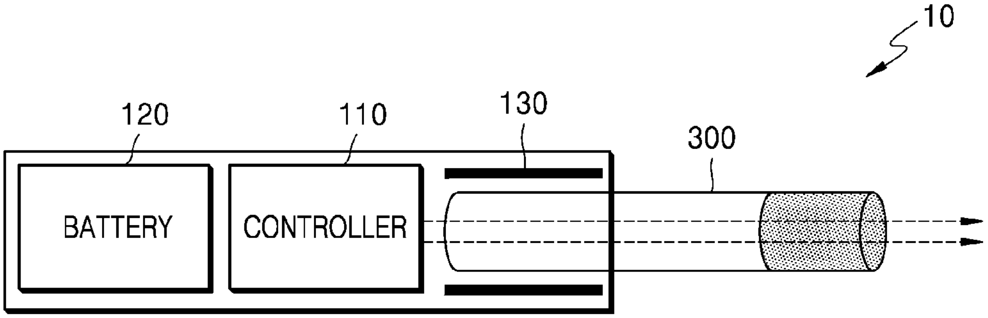
[Fig. 4]
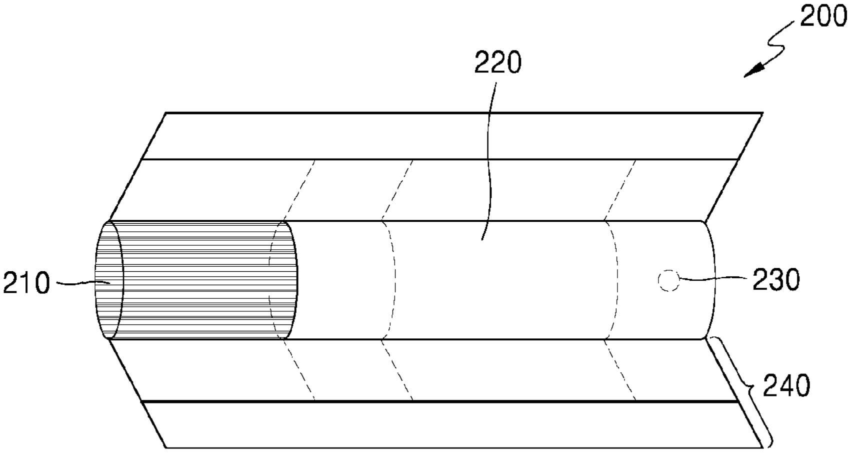
[Fig. 5]
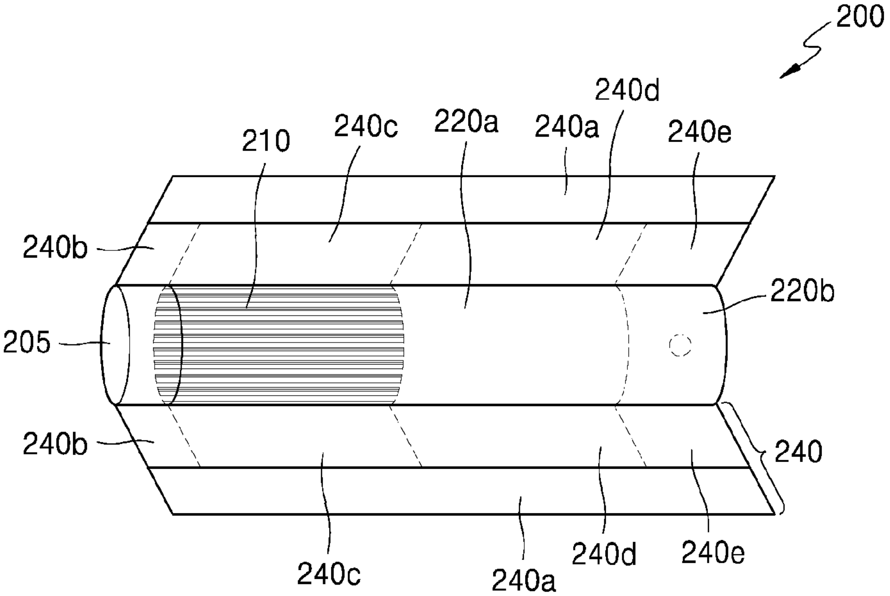

[Fig. 6]
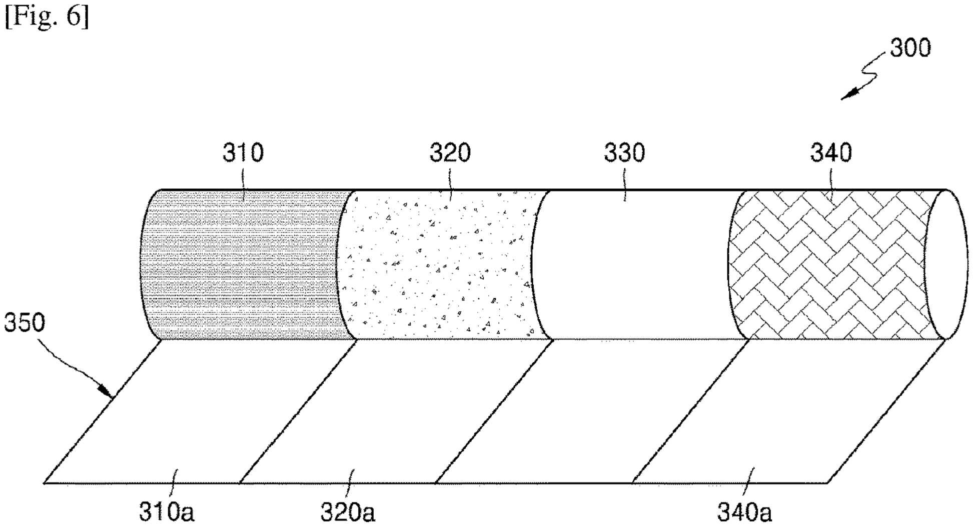
[Fig. 7]
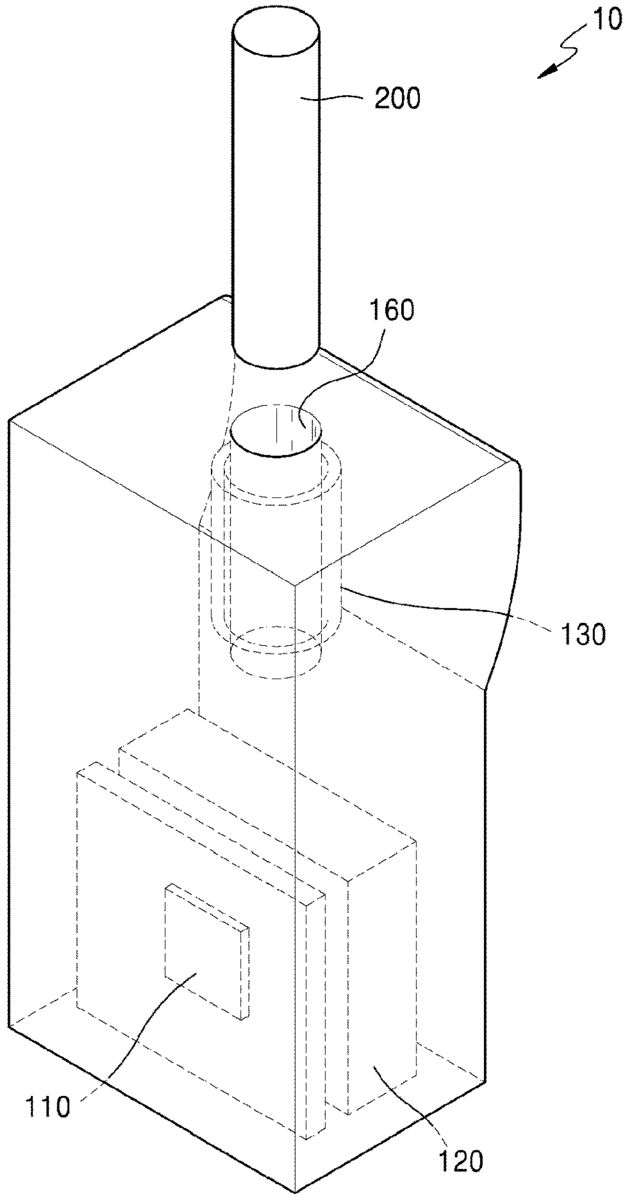

[Fig. 8]
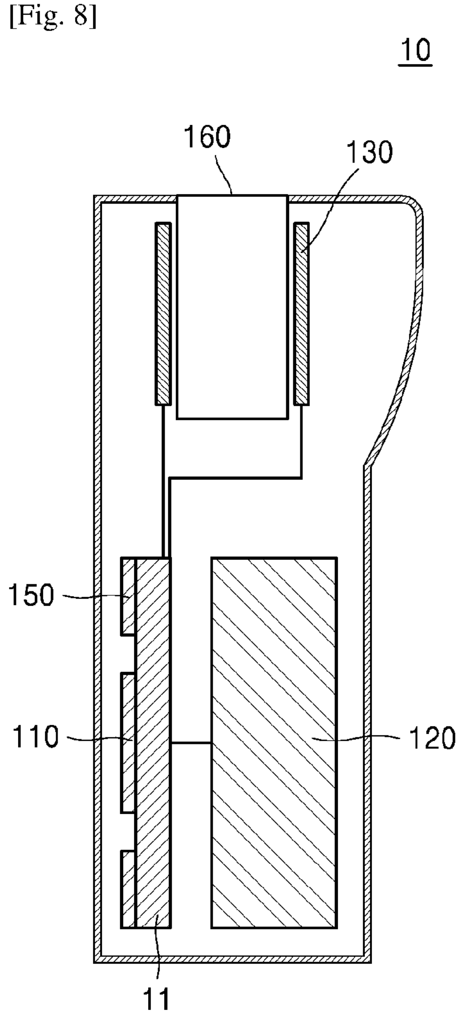
[Fig. 9]
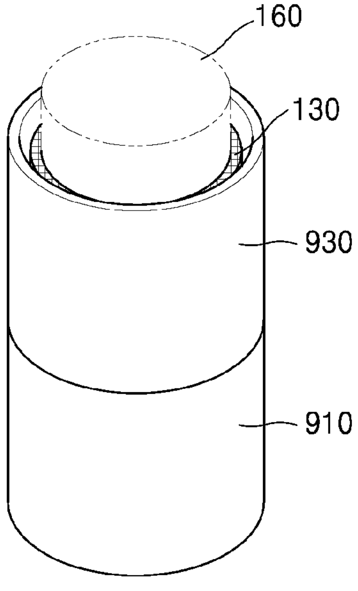

[Fig. 10]
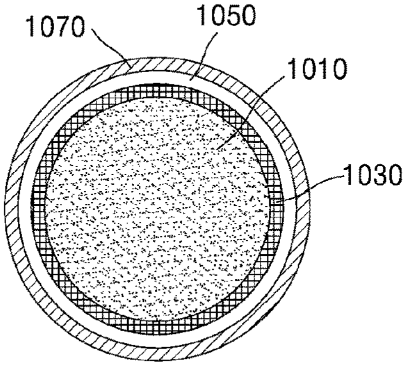
[Fig. 11]
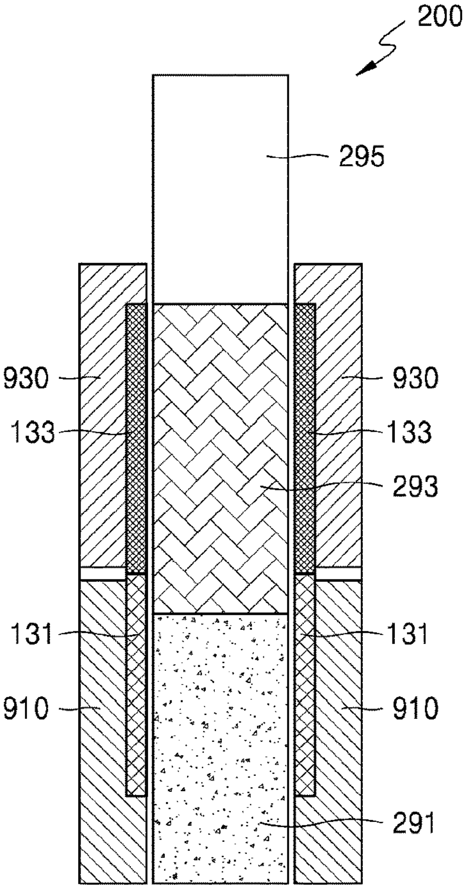
[Fig. 12]
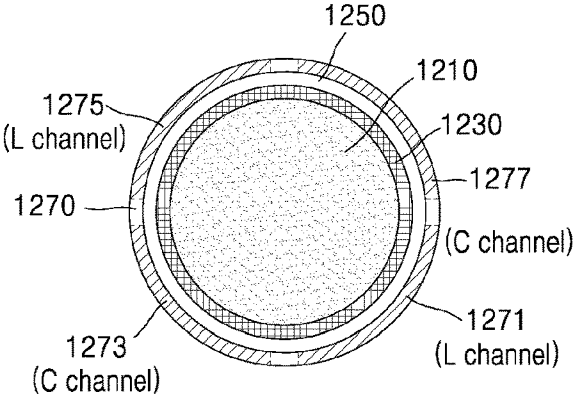

[Fig. 13]
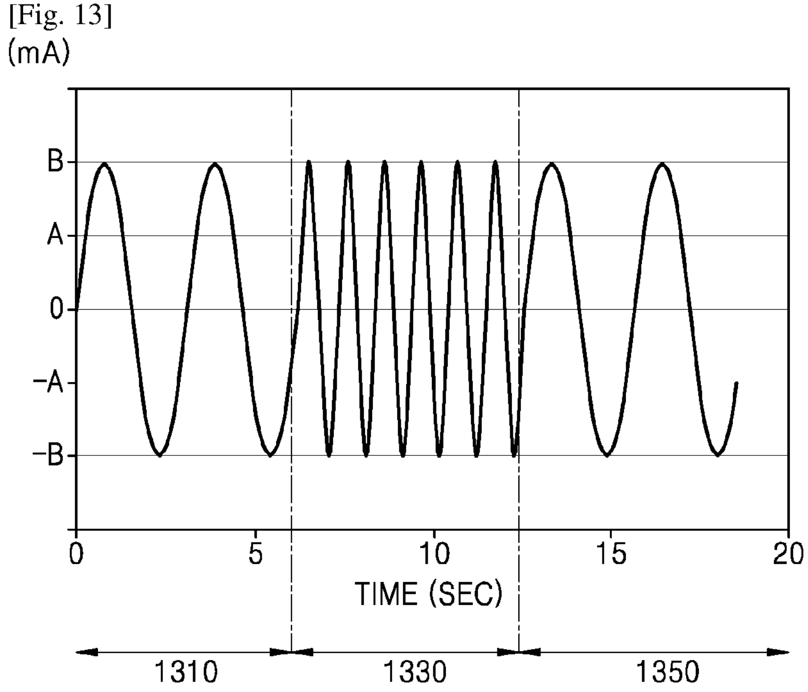
[Fig. 14]
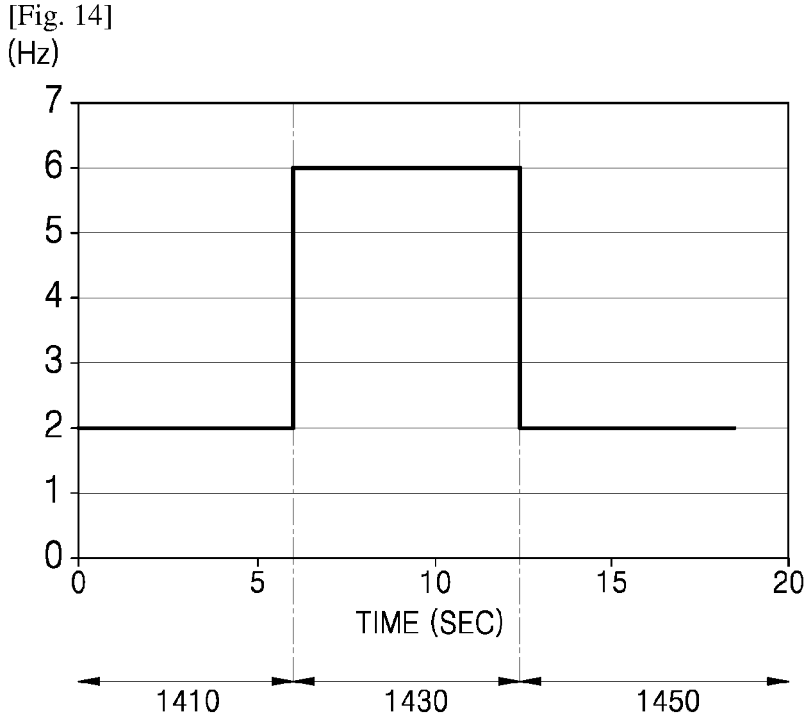

[Fig. 15]
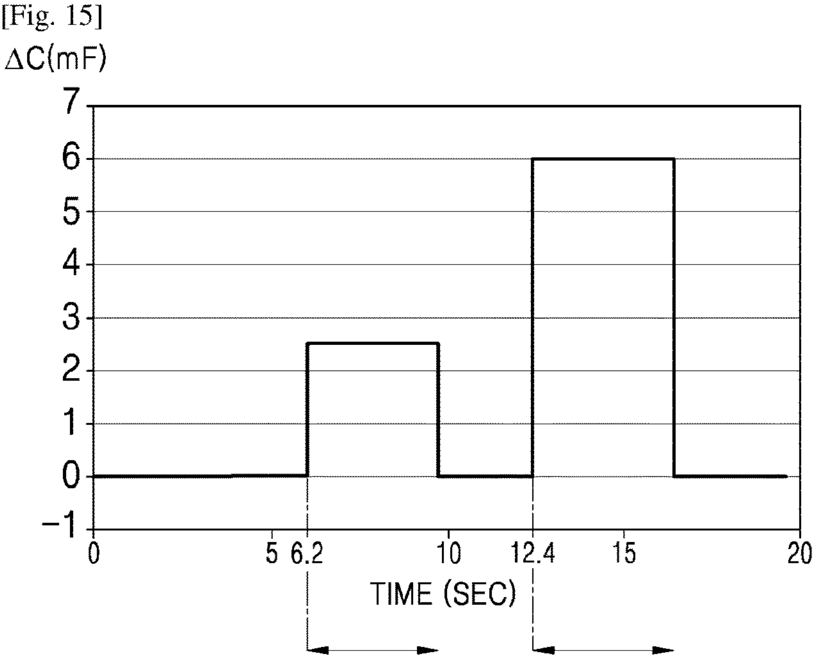
[Fig. 16]
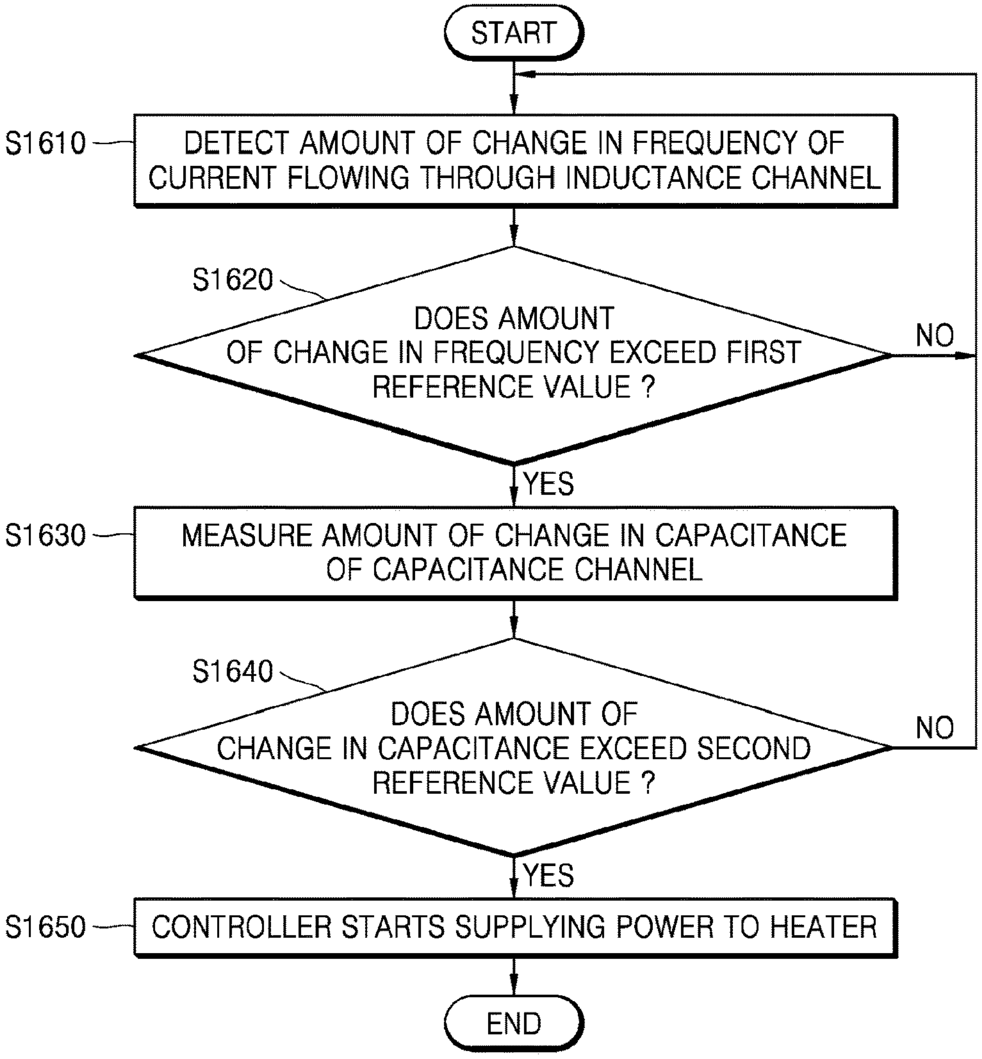

AEROSOL GENERATING DEVICE

CROSS REFERENCE TO RELATED APPLICATIONS

This application is a National Stage of International Application No. PCT/KR2021/005302 filed Apr. 27, 2021, claiming priority based on Korean Patent Application No. 10-2020-0067172 filed Jun. 3, 2020.

TECHNICAL FIELD

Embodiments of the present disclosure relate to an aerosol generating device, and particularly, to an aerosol generating device capable of generating an aerosol by a heater included in the aerosol generating device, without directly contacting the heater with the cigarette.

BACKGROUND ART

Recently, there has been increasing demand for alternative ways of overcoming the disadvantages of common cigarettes. For example, there is an increasing demand for a method of generating aerosol by heating an aerosol generating material in cigarettes, rather than by burning cigarettes. Accordingly, research into a heating-type cigarette or a heating-type aerosol generator has been actively conducted.

With a widespread use of aerosol generating devices, users of aerosol generating devices tend to consider not only smoking satisfaction due to the quality of aerosols, but also various conveniences. For example, users prefer to visually check meaningful statistical values such as usage history on a display provided in the aerosol generating device. In addition, when the aerosol generating device is used for a long period of time, periodic cleaning of the device is necessary, so users prefer a device with an added function to facilitate cleaning.

In addition, as part of increasing the usability of the aerosol-generating device, an aerosol-generating device with a smart-on function has also been released. In the aerosol-generating device with the smart on function added, the preparation process for using the device is automatically performed as soon as the aerosol-generating material is mounted on the device. Thus, the time it takes for a user to power on the device and inhale the aerosol through the device may be drastically reduced.

DISCLOSURE OF INVENTION

Technical Problem

A technical problem to be solved by embodiments of the present disclosure is to provide an aerosol generating device for preventing a smart-on function from being activated by a magnetic material approaching the device when the magnetic material is not an aerosol-generating material, wherein the aerosol generating device, that includes the smart-on function, includes an inductance channel in order to implement the smart-on function.

Solution to Problem

A device according to an embodiment of the present disclosure for solving the above technical problem may include a heater for heating a cigarette to generate an aerosol; a cigarette insertion space into which the cigarette is inserted; an inductance channel; a capacitance channel;

and a controller configured to generate a control signal using information received from the inductance channel and the capacitance channel, wherein the controller measures an amount of change in capacitance in the capacitance channel when an amount of change in frequency of the current flowing through the inductance channel by an object adjacent to the cigarette insertion space exceeds a first reference range, and controls to start supplying power to the heater when the amount of change in the measured capacitance exceeds a second reference range.

A device according to another embodiment of the present disclosure for solving the above technical problem may include a heater for heating a cigarette to generate an aerosol; a cigarette insertion space into which the cigarette is inserted; an inductance channel; a capacitance channel; and a controller configured to generate a control signal from information received from the inductance channel and the capacitance channel, wherein the controller, when an amount of change in a frequency of current flowing through the inductance channel by an object adjacent to the cigarette insertion space exceeds a first reference range and an amount of change in capacitance measured in the capacitance channel exceeds a second reference range, controls to start supplying power to the heater.

Advantageous Effects of Invention

According to embodiments of the present disclosure, even if a magnetic material that does not contain any aerosol-generating materials is adjacent to the aerosol generating device, to which the smart-on function is included, the smart-on function is not activated, thereby minimizing battery waste and preventing overheating of the heater in situations where the user is unaware.

BRIEF DESCRIPTION OF DRAWINGS

FIG. 3 is a diagram illustrating another example in which a cigarette is inserted into an aerosol generating device.

FIG. 4 is a diagram showing an example of a cigarette.

FIG. 5 is a view showing another example of a cigarette.

FIG. 6 is a view showing an example of a double medium cigarette used in the device of FIG. 3.

FIG. 7 is a perspective view of an example of an aerosol generating device according to an embodiment of the present disclosure.

FIG. 8 is a side view of the device described in FIG. 7.

FIG. 9 is a diagram illustrating an example of a cigarette insertion space and a passive component channel of FIG. 7 in detail.

FIG. 10 is a cross-sectional view of the cigarette insertion space illustrated in FIG. 9.

FIG. 11 is a diagram schematically showing an example of an arrangement of a passive component channel.

FIG. 12 is a cross-sectional view of the cigarette insertion space illustrated in FIG. 11.

FIG. 13 is an example of a graph showing a change in frequency detected by an inductance channel.

FIG. 14 is another example of a graph showing a change in frequency detected by an inductance channel.

FIG. 15 is an example of a graph showing a change in capacitance sensed by a capacitance channel.

FIG. 16 is a flowchart sequentially showing a process of operating an aerosol generating device according to an embodiment of the present disclosure.

BEST MODE FOR CARRYING OUT THE INVENTION

Figure 1:
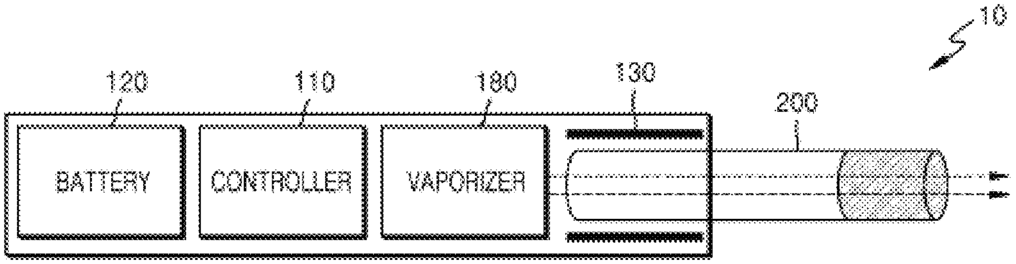
FIG. 1 is a first diagram illustrating an example in which a cigarette is inserted into an aerosol generating device.

According to one or more embodiments, an aerosol generating device is provided. The aerosol generating device includes: a heater configured to heat a cigarette to generate an aerosol; an inductance channel; a capacitance channel; and a controller configured to generate a control signal using information received from the inductance channel and the capacitance channel, wherein a cigarette insertion space that is configured to receive the cigarette is provided within the aerosol generating device, and the controller is configured to: measure an amount of change in capacitance in the capacitance channel based on an amount of change in frequency of current flowing through the inductance channel exceeding a first reference value, due to an object adjacent to the cigarette insertion space, and control a start of a supply of power to the heater based on the amount of change in the capacitance that is measured exceeding a second reference value.

According to an embodiment, at least one from among the inductance channel and the capacitance channel is adjacent to the cigarette insertion space.

According to an embodiment, the cigarette insertion space has a cylindrical shape such as to be configured to receive a part of the cigarette to be heated by the heater, and the inductance channel and the capacitance channel are arranged to surround an outer circumferential boundary of the cigarette insertion space.

According to an embodiment, at least one of the inductance channel and the capacitance channel is in a circumferential direction of the cigarette insertion space.

According to an embodiment, the heater is a susceptor that is configured to be heated depending on a change of the current.

According to an embodiment, the heater includes a first heater and a second heater that are arranged along a height of the cigarette insertion space, and the controller is configured to cause the first heater and the second heater to heat at different temperatures from each other.

According to an embodiment, the inductance channel and the capacitance channel are positioned to correspond to the first heater and the second heater, respectively.

According to an embodiment, the inductance channel is an inductive digital converter (LDC) sensor, the LDC sensor is configured to generate an interrupt, and the controller is configured to determine that the amount of change in the frequency exceeds the first reference value based on the interrupt.

According to an embodiment, the capacitance channel is configured to output a signal indicating the capacitance that varies depending on an object inserted into the cigarette insertion space, between two electrodes arranged at respective ends of the cigarette insertion space, and the controller is configured to, based on a difference between the capacitance and a preset reference value exceeding the second reference value, start supplying the power to the heater.

According to one or more embodiments, an aerosol generating device is provided. The aerosol generating device includes: a heater configured to heat a cigarette to generate an aerosol; an inductance channel; a capacitance channel; and a controller configured to generate a control signal using information received from the inductance channel and the capacitance channel; wherein a cigarette insertion space that is configured to receive the cigarette is provided within the aerosol generating device, and the controller is configured to control a start of a supply of power to the heater based on an amount of change in capacitance that is measured exceeding a second reference value in a case where an amount of change in a frequency of current flowing through the inductance channel by an object adjacent to the cigarette insertion space exceeds a first reference value.

According to an embodiment, the cigarette insertion space has a cylindrical shape such as to be configured to receive a part of the cigarette to be heated by the heater, and the inductance channel and the capacitance channel are arranged to surround an outer circumferential boundary of the cigarette insertion space.

According to an embodiment, at least one of the inductance channel and the capacitance channel is in a circumferential direction of the cigarette insertion space.

According to an embodiment, the heater is a susceptor that is configured to be heated depending on a change of the current.

According to an embodiment, the heater includes a first heater and a second heater that are arranged along a height of the cigarette insertion space, the controller is configured to cause the first heater and the second heater to heat at different temperatures from each other, and the inductance channel and the capacitance channel are positioned to correspond to the first heater and the second heater, respectively.

According to an embodiment, the inductance channel is an inductive digital converter (LDC) sensor, the LDC sensor is configured to generate an interrupt, and the controller is configured to determine that the amount of change in the frequency exceeds the first reference value based on the interrupt.

Mode for the Invention

With respect to the terms used to describe the various embodiments, general terms which are currently and widely used are selected in consideration of functions of structural elements in the various embodiments of the present disclosure. However, meanings of the terms can be provided according to intention, a judicial precedence, the appearance of new technology, and the like. There are terms discretionally selected by an applicant on particular occasions. These terms will be explained in detail in relevant description. Therefore, terms used herein are not just names but should be defined based on the meaning of the terms and the whole content of the present disclosure.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and/or operation and can be implemented by hardware components or software components and combinations thereof.

It will be understood that when an element is referred to as being "over," "above," "on," "below," "under," "beneath," "connected to" or "coupled to" another element, it can be directly over, above, on, below, under, beneath, connected or coupled to the other element or intervening elements may be present. In contrast, when an element is referred to as being "directly over," "directly above," "directly on," "directly below," "directly under," "directly beneath," "directly connected to" or "directly coupled to" another element, there are no intervening elements present.

The attached drawings for illustrating one or more embodiments are referred to in order to gain a sufficient understanding, the merits thereof, and the objectives accomplished by the implementation. Embodiments of the present disclosure may, however, be embodied in many different forms and should not be construed as being limited to the example embodiments set forth herein.

Hereinafter, embodiments of the present disclosure will be described in detail with reference to the drawings.

Figure 2:
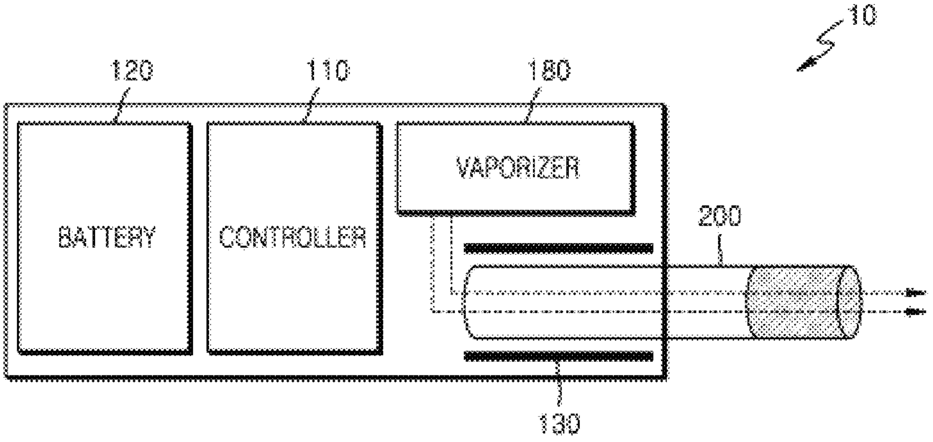
FIG. 2 is a second diagram illustrating an example in which a cigarette is inserted into an aerosol generating device.

FIGS. 1 and 2 are diagrams showing examples in which a cigarette is inserted into an aerosol generating device.

Referring to FIGS. 1 and 2, an aerosol generating device 10 includes a battery 120, a controller 110, a heater 130, and a vaporizer 180. A cigarette 200 may be inserted into an internal space of the aerosol generating device 10.

Some elements related to the embodiment are illustrated in the aerosol generating device 10 of FIGS. 1 to 2. However, one of ordinary skill in the art would appreciate that other universal elements may be further included in the aerosol generating device 10.

In addition, although it is shown that the heater 130 is included in the aerosol generating device 10 in FIGS. 1 and 2, the heater 130 may be omitted according to some embodiments.

In FIG. 1, the battery 120, the controller 110, the heater 130, and the vaporizer 180 are arranged in a row. Also, FIG. 2 shows that the vaporizer 180 and the heater 130 are arranged in parallel with each other. However, an internal structure of the aerosol generating device 10 is not limited to the examples shown in FIG. 1 or 2. That is, according to a design of the aerosol generating device 10, arrangement of the battery 120, the controller 110, the heater 130, and the vaporizer 180 may be changed.

When the cigarette 200 is inserted into the aerosol generating device 10, the aerosol generating device 10 operates the heater 130 and/or the vaporizer 180 to generate aerosol from the cigarette 200 and/or the vaporizer 180. The aerosol generated by the vaporizer 180 may be transferred to a user via the cigarette 200. The vaporizer 180 will be described in more detail below.

The battery 120 supplies the electric power used to operate the aerosol generating device 10. For example, the battery 120 may supply power for heating the heater 130 or the vaporizer 180 and supply power for operating the controller 110. In addition, the battery 120 may supply power for operating a display, a sensor, a motor, and the like installed in the aerosol generating device 10.

The controller 110 controls the overall operation of the aerosol generating device 10. In detail, the controller 110 may control operations of other elements included in the aerosol generating device 10 such as, for example, the battery 120, the heater 130, and the vaporizer 180. Also, the controller 110 may check the status of each component in the aerosol generating device 10 to determine whether the aerosol generating device 10 is in an operable state.

The controller 110 includes at least one processor. A processor may be implemented as an array of a plurality of logic gates or may be implemented as a combination of a general-purpose microprocessor and a memory in which a program executable by the microprocessor is stored. According to embodiments, the program may store computer code that, when executed by the at least one processor, causes the at least one processor to perform its functions described in the present disclosure. It will be understood by one of ordinary skill in the art that the controller 110 of embodiments of the present disclosure may be implemented in other forms of hardware.

The heater 130 may be heated by the electric power supplied from the battery 120. For example, when the cigarette is inserted in the aerosol generating device 10, the heater 130 may be located outside the cigarette. Therefore, the heated heater 130 may raise the temperature of an aerosol generating material in the cigarette.

The heater 130 may be an electro-resistive heater. For example, the heater 130 includes an electrically conductive track, and the heater 130 may be heated as a current flows through the electrically conductive track. However, the heater 130 is not limited to the above example, and any type of heater may be used provided that the heater is heated to a desired temperature. Here, the desired temperature may be set in advance on the aerosol generating device 10, or may be set by a user.

In addition, in another example, the heater 130 may include an induction heating type heater. In detail, the heater 130 may include an electrically conductive coil for heating the cigarette in an induction heating method, and the cigarette may include a susceptor that may be heated by the induction heating type heater.

In the FIGS. 1 and 2, the heater 130 is shown to be disposed outside the cigarette 200, but is not limited thereto. For example, the heater 130 may include a tubular heating element, a plate-shaped heating element, a needle-shaped heating element, or a rod-shaped heating element. And the inside or outside of the cigarette 200 can be heated by the heating element.

Also, there may be a plurality of heaters 130 in the aerosol generating device 10. Here, the plurality of heaters 130 may be arranged to be inserted into the cigarette 200 or on the outside of the cigarette 200. Also, some of the plurality of heaters 130 may be arranged to be inserted into the cigarette 200 and the other(s) may be arranged on the outside of the cigarette 200. In addition, the shape of the heater 130 is not limited to the example shown in FIGS. 1 and 2, and may be manufactured in various shapes.

The vaporizer 180 may generate aerosol by heating a liquid composition and the generated aerosol may be delivered to the user after passing through the cigarette 200. In other words, the aerosol generated by the vaporizer 180 may move along an air flow passage of the aerosol generating device 10, and the air flow passage may be configured for the aerosol generated by the vaporizer 180 to be delivered to the user through the cigarette.

For example, the vaporizer 180 may include a liquid storage unit, a liquid delivering unit, and a heating element, but is not limited thereto. For example, the liquid storage unit, the liquid delivering unit, and the heating element may be included in the aerosol generating device 10 as independent modules.

The liquid storage may store a liquid composition. For example, the liquid composition may be a liquid including a tobacco containing material including a volatile tobacco flavor component, or a liquid including a non-tobacco material. The liquid storage unit may be attached to/detached from the vaporizer 180 or may be integrally manufactured with the vaporizer 180.

For example, the liquid composition may include water, solvents, ethanol, plant extracts, flavorings, flavoring agents, or vitamin mixtures. The flavoring may include, but is not limited to, menthol, peppermint, spearmint oil, various fruit flavoring ingredients, etc. The flavoring agent may include components that may provide the user with various flavors or tastes. Vitamin mixtures may be a mixture of at least one of vitamin A, vitamin B, vitamin C, and vitamin E, but are not limited thereto. Also, the liquid composition may include an aerosol former such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivering unit. For example, the heating element may be a metal heating wire, a metal hot plate, a ceramic heater, or the like, but is not limited thereto. In addition, the heating element may include a conductive filament such as nichrome wire and may be wound around the liquid delivery element. The heating element may be heated by a current supply and may transfer heat to the liquid composition in contact with the heating element, thereby heating the liquid composition. As a result, aerosol may be generated.

For example, the vaporizer 180 may be referred to as a cartomizer or an atomizer, but is not limited thereto.

The aerosol generating device 10 may further include universal elements, in addition to the battery 120, the controller 110, the heater 130, and the vaporizer 180. For example, the aerosol generating device 10 may include a display capable of outputting visual information and/or a motor for outputting tactile information. In addition, the aerosol generating device 10 may include at least one sensor (a puff sensor, a temperature sensor, a cigarette insertion sensor, etc.) Also, the aerosol generating device 10 may be manufactured to have a structure, in which external air may be introduced or internal air may be discharged even in a state where the cigarette 200 is inserted.

Although not shown in FIGS. 1 and 2, the aerosol generating device 10 may be configured as a part of a system with a cradle. For example, the cradle may be used to charge the battery 120 of the aerosol generating device 10. Alternatively, the heater 130 may be heated in a state in which the cradle and the aerosol generating device 10 are coupled to each other.

The cigarette 200 may be similar to a typical burning cigarette. For example, the cigarette 200 may include a first portion containing an aerosol generating material and a second portion including a filter and the like. Alternatively, the second portion of the cigarette 200 may also include the aerosol generating material. For example, an aerosol generating material made in the form of granules or capsules may be inserted into the second portion.

The entire first portion may be inserted into the aerosol generating device 10 and the second portion may be exposed to the outside. Alternatively, only a portion of the first portion may be inserted into the aerosol generating device 10 or the entire first portion and a portion of the second portion may be inserted into the aerosol generating device 10. The user may puff aerosol while holding the second portion with their mouth. At this time, the aerosol is generated by as the outside air passes through the first portion, and the generated aerosol passes through the second portion and is delivered to a user's mouth.

For example, the outside air may be introduced through at least one air passage formed in the aerosol generating device 10. For example, the opening and closing of the air passage formed in the aerosol generating device 10 and/or the size of the air passage may be adjusted by a user. Accordingly, the amount of smoke and a smoking impression may be adjusted by the user. In another example, the outside air may be introduced into the cigarette 200 through at least one hole formed in a surface of the cigarette 200.

FIG. 3 is a diagram illustrating another example in which a cigarette is inserted into an aerosol generating device.

When FIG. 3 is compared with the aerosol generating apparatus described through FIGS. 1 and 2, it can be seen that the vaporizer 180 is omitted. Since the element that performs the function of the vaporizer 180 is included in the double medium cigarette 300 inserted into the aerosol generating device shown in FIG. 3, the aerosol generating device shown in FIG. 3 does not include the vaporizer 180.

When the double medium cigarette 300 is inserted the aerosol generating device 10 in FIG. 3, the double medium cigarette 300 is externally heated, so that a user-inhalable aerosol can be generated from the double medium cigarette 300. The aerosol generating device 10 shown in FIG. 3 may have the heater 130 which is divided into two parts to heat the first medium part and the second medium part of the double medium cigarette 300. The first medium part and the second medium part can be heated at different temperatures. A schematic description of this will be provided with reference to FIG. 11. Also, the double medium cigarette 300 will be described with reference to FIG. 6.

Hereinafter, an example of the cigarette 200 will be described with reference to FIG. 4.

FIG. 4 is a drawing illustrating an example of a cigarette.

Referring to FIG. 4, the cigarette 200 includes a tobacco rod 210 and a filter rod 220. The first portion described above with reference to FIGS. 1 to 2 include the tobacco rod 210 and the second portion includes the filter rod 220.

In FIG. 4, the filter rod 220 is shown as a single segment, but is not limited thereto. In other words, the filter rod 220 may include a plurality of segments. For example, the filter rod 220 may include a first segment for cooling down the aerosol and a second segment for filtering a predetermined component included in the aerosol. Also, according to embodiments, the filter rod 220 may further include at least one segment performing another function.

The cigarette 200 may be packaged by at least one wrapper 240. The at least one wrapper 240 may include at least one hole through which the outside air is introduced or inside air is discharged. For example, the cigarette 200 may be packaged by one wrapper 240. In another example, the cigarette 200 may be packaged by two or more wrappers 240. For example, the tobacco rod 210 may be packaged by a first wrapper and the filter rod 220 may be packaged by a second wrapper. In addition, the tobacco rod 210 and the filter rod 220 are respectively packaged by single wrappers, and then, the cigarette 200 may be entirely re-packaged by a third wrapper. When each of the tobacco rod 210 and the filter rod 220 includes a plurality of segments, each of the segments may be packaged by a single wrapper. In addition, the cigarette 200, in which the segments respectively packaged by the single wrappers are coupled to one another, may be re-packaged by another wrapper.

The tobacco rod 210 includes an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. In addition, the tobacco rod 210 may include other additive materials like a flavoring agent, a wetting agent, and/or an organic acid. Also, a flavoring liquid such as menthol, humectant, etc. may be added to the tobacco rod 210 by being sprayed to the tobacco rod 210.

The tobacco rod 210 may be manufactured variously. For example, the tobacco rod 210 may be fabricated as a sheet or a strand. Also, the tobacco rod 210 may be fabricated by tobacco leaves that are obtained by fine-cutting a tobacco sheet. Also, the tobacco rod 210 may be surrounded by a heat conducting material. For example, the heat-conducting material may be, but is not limited to, a metal foil such as aluminum foil. For example, the heat conducting material surrounding the tobacco rod 210 may improve a thermal conductivity applied to the tobacco rod by evenly dispersing the heat transferred to the tobacco rod 210, and thus, improving tobacco taste. Also, the heat conducting material surrounding the tobacco rod 210 may function as a susceptor that is heated by an inducting heating-type heater. Although not shown in the drawings, the tobacco rod 210 may further include a susceptor, in addition to the heat conducting material surrounding the outside thereof.

The filter rod 220 may be a cellulose acetate filter. In addition, the filter rod 220 is not limited to a particular shape. For example, the filter rod 220 may be a cylinder-type rod or a tube-type rod including a cavity therein. Also, the filter rod 220 may be a recess type rod. When the filter rod 220 includes a plurality of segments, at least one of the plurality of segments may have a different shape from the others.

The filter rod 220 may be manufactured to generate flavor. For example, a flavoring liquid may be sprayed to the filter rod 220 or separate fibers on which the flavoring liquid is applied may be inserted in the filter rod 220.

Also, the filter rod 220 may include at least one capsule 230. Here, the capsule 230 may generate flavor or may generate aerosol. For example, the capsule 230 may have a structure, in which a liquid containing a flavoring material is wrapped with a film. The capsule 230 may have a circular or cylindrical shape, but is not limited thereto.

When the filter rod 220 includes a segment for cooling down the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. However, the cooling segment is not limited to the above examples, and may include any material provided that a function of cooling down the aerosol is implemented.

Although not shown in FIG. 4, the cigarette 200 according to the embodiment may further include a front-end filter. The front-end filter is at a side facing the filter rod 220, in the tobacco rod 210. The front-end filter may prevent the tobacco rod 210 from escaping to the outside and may prevent the liquefied aerosol from flowing to the aerosol generating device 10 (see FIGS. 1 to 2) from the tobacco rod 210 during smoking.

FIG. 5 is a view illustrating another example of a cigarette.

Referring to FIG. 5, it can be seen that the cigarette 200 has a form in which a cross tube 205, the tobacco rod 210, a tube 220*a*, and a filter 220*b* are wrapped by the wrapper 240. In FIG. 5, the wrapper 240 includes individual wrappers that are individually wrapped around the cross tube 205, the tobacco rod 210, the tube 220*a*, and the filter 220*b*, and a final wrapper that is collectively wrapped around the cross tube 205, the tobacco rod 210, the tube 220*a*, and the filter 220*b*.

The first portion described above with reference to FIGS. 1 and 2 includes the cross tube 205 and the tobacco rod 210, and the second portion includes the filter rod 220. For the sake of convenient description, the following description will be made with reference to FIG. 4, and description overlapping with the description made with reference to FIGS. 1-2 will be omitted.

The cross tube 205 refers to a cross-shaped tube connected to the tobacco rod 210.

The tobacco rod 210 includes an aerosol generating substrate that generates an aerosol by being heated by the heater 130 of the aerosol generating device 10.

The tube 220*a* performs a function of transferring an aerosol generated when an aerosol generating substrate of the tobacco rod 210 is heated by receiving the sufficient amount of energy from the heater 130 to the filter 220*b*. The tube 220*a* is manufactured in a manner in which triacetin (TA) which a plasticizer is added to a cellulose acetate tow by more than a certain amount to form a circle, and not only is different in shape but also has a difference in arrangement in that the tobacco rod 210 and the filter 220*b* are connected to each other, as compared with the cross tube 205.

When the aerosol generated by the tobacco rod 210 is transferred through the tube 220*a*, the filter 220*b* performs a function of allowing a user to puff the aerosol filtered by the filter 220*b* by passing the aerosol therethrough. The filter 220*b* may include a cellulose acetate filter manufactured based on a cellulose acetate tow.

The wrapper 240 is paper that is wrapped around the cross tube 205, the tobacco rod 210, the tube 220*a*, and the filter 220*b*, and may include all of a cross tube wrapper 240*b*, a tobacco rod wrapper 240*c*, a tube wrapper 240*d*, a filter wrapper 240*e*, and a final wrapper 240*a*.

In FIG. 5, the cross tube wrapper 240*b* is wrapped by an aluminum wrapper, the tube 220*a* is wrapped by an MFW or 24K wrapper, and the filter 220*b* is wrapped by an oil-resistant hard wrapper or a lamination of a poly lactic acid (PLA) material. The tobacco rod wrapper 240*c* and the final wrapper 240*a* will be described in more detail below.

The tobacco rod wrapper 240*c* is wrapped around the tobacco rod 210 and may be coated with a thermal conductivity enhancement material to maximize efficiency of thermal energy transferred by the heater 130. For example, the tobacco rod wrapper 240*c* may be manufactured in a manner in which a general wrapper or heterotype base paper is coated with at least one from among silver foil (Ag), aluminum foil (Al), copper foil (Cu), carbon paper, filler, ceramic (AlN, $Al_2O_3$), silicon carbide, sodium citrate (Na citrate), potassium citrate (K citrate), aramid fiber, nano cellulose, mineral paper, glassine paper, and single-walled carbon nanotube (SWNT). A general wrapper refers to a wrapper applied to widely known cigarettes and refers to a porous wrapper made of a proven material that has both paper manufacturing workability and a thermal conductivity exceeding a certain value through a water paper test.

In addition, in embodiments of the present disclosure, the wrapper 240 may be manufactured in a manner in which an MFW (a kind of sterilized paper) base paper is coated with at least one from among filler, ceramic, silicon carbide, sodium citrate, potassium citrate, aramid fiber, nano cellulose, and SWNT among various materials coating the tobacco rod wrapper 240*c*.

The heater 130 included in the aerosol generating device 10 described in FIGS. 1 and 2 is a target controlled by the controller 110, and heats the aerosol generating substrate included in the tobacco rod 210 to generate an aerosol, and at this time, thermal energy transferred to the tobacco rod 210 is composed of a ratio of 75% by radiant heat, 15% by convective heat, and 10% by conductive heat. The ratio between the radiant heat, the convective heat, and the conductive heat constituting the thermal energy transferred to the tobacco rod 210 may be different depending on the embodiment.

In embodiments of the present disclosure, in order to overcome the difficulty in quickly generating an aerosol because thermal energy may not be transferred with the heater 130 in direct contact with an aerosol generating substrate, the tobacco rod wrapper 240*c* and the final wrapper 240*a* are coated with a thermal conductivity enhancement material to prompt an efficient transfer of the thermal energy to the aerosol generating substrate of the tobacco rod 210, and thus, a sufficient amount of aerosol may be provided to a user even during an initial puff before the heater 130 is sufficiently heated.

Depending on the embodiment, only one of the tobacco rod wrapper 240*c* and the final wrapper 240*a* may also be coated with a thermal conductivity enhancement material, and in some embodiments the tobacco rod wrapper 240*c* or the final wrapper 240*a* is coated with organic metal, inorganic metal, fiber, or polymer material which has a thermal conductivity of a preset value, as well as the above-described examples.

FIG. 6 is an example of a double medium cigarette used in the device of FIG. 3.

In FIG. 6, the double medium cigarette is named not only for the purpose of distinguishing from the cigarettes described in FIGS. 4 and 5, but also for concise description of embodiments of the present disclosure.

Referring the FIG. 6, the double medium cigarette 300 has an aerosol base portion 310, a medium portion 320, cooling portion 330, and the filter portion 340, which are wrapped by one or more wrappers. The aerosol base portion 310, the medium portion 320, and the filter portion 340 are wrapped by individual wrappers, and the final wrapper 350 wraps the individual wrappers. The individual wrappers may include an aerosol base wrapper 310*a*, a media wrapper 320*a*, and a filter wrapper 340*a*.

The aerosol base portion 310 is formed into a predetermined shape by containing a humectant in pulp-based paper. The aerosol base portion 310 may comprise propylene glycol or glycerin as the humectant. The humectant of the aerosol base portion 310 may comprise propylene glycol and glycerin having a certain weight ratio to the weight of the base paper. When the double medium cigarette 300 is inserted into the aerosol generating device 10 of FIG. 3, the aerosol base portion 310 is located closest to the heater 130.

When the aerosol base portion 310 is heated to a certain temperature by the heater 130, it generates moisture vapor.

The medium portion 320 comprises one or more of a sheet, a strand, and tobacco leaves that are obtained by fine-cutting a tobacco sheet, and is a portion that generates nicotine to provide a smoking experience to a user. The medium portion 320 is not directly heated by the heater 130, even if the double medium cigarette 300 is inserted into the aerosol generating device 10 of FIG. 3.

The medium portion 320 can be heated indirectly by conduction, convection, and radiation from the media wrapper 320*a* (or final wrapper) wrapping the aerosol base portion 310 and/or the medium portion 320. In embodiments of the present disclosure, in consideration of the characteristic that the temperature to which the medium contained in the medium portion 320 must reach is lower than the temperature to which the humectant included in the aerosol base portion 310 must reach, the aerosol base portion 310 is heated with the heater 130 to indirectly increase the temperature of the medium portion 320. When the medium portion 320 is heated to a certain temperature by the heater 130, it generates nicotine vapor.

According to a specific embodiment, when the double medium cigarette 300 is inserted into the aerosol generating device 10 of FIG. 3, a part of the medium portion 320 may face the heater 130.

The cooling portion 330 is made of a tube filter containing a plasticizer with a predetermined weight. The moisture vapor from the aerosol base portion 310 and the nicotine vapor from the medium portion 320 are mixed to be aerosolized, are cooled while passing through the cooling portion 330.

Unlike the other portions, the cooling portion 330 is not wrapped by an individual wrapper.

The filter portion 340 may be a cellulose acetate filter, and the filter portion 340 is not limited to a particular shape. For example, the filter portion 340 may be a cylinder-type rod or a tube-type rod including a cavity therein. When the filter portion 340 includes a plurality of segments, at least one of the plurality of segments may have a different shape from the others. The filter portion 340 may be manufactured to generate flavor. For example, a flavoring liquid may be sprayed to the filter portion 340 or separate fibers on which the flavoring liquid is applied may be inserted in the filter portion 340.

Also, the filter portion 340 may include at least one capsule. Here, the capsule may generate flavor or may generate aerosol. For example, the capsule may have a structure, in which a liquid containing a flavoring material is wrapped with a film. The capsule may have a circular or cylindrical shape, but is not limited thereto.

The one or more wrappers may refer to the aerosol base wrapper 310*a*, the media wrapper 320*a*, and the filter wrapper 340*a* that wrap the aerosol base portion 310, the medium portion 320, and the filter portion 340, respectively, in combination with the final wrapper 350 that wraps the individual wrappers.

FIG. 7 is a perspective view of an example of an aerosol generating device according to an embodiment of the present disclosure.

Referring to FIG. 7, it may be seen that the aerosol generating device 10 according to an embodiment of the present disclosure includes a controller 110, a battery 120, a heater 130, and a cigarette 200. FIG. 7 shows only a partial configuration of the aerosol generating device 10 by emphasizing for convenience of description. Therefore, it will be apparent to those of ordinary skill in the art that other configurations may be added to the embodiment without departing from the scope of the present disclosure.

In addition, the internal structure of the aerosol generating device 10 is not limited to that shown in FIG. 7, and depending on an embodiment or design, the arrangement of the controller 110, the battery 120, the heater 130, and the cigarette 200 may be different. Description of each element of FIG. 7 has already been given with reference to FIGS. 1 to 3, and thus will be omitted.

FIG. 8 is a side view of the device illustrated in FIG. 7.

Referring to FIG. 8, the aerosol generating device 10 according to an embodiment of the present disclosure includes a Printed Circuit Board (PCB) 11, a controller 110, a battery 120, a heater 130, a display 150, and a cigarette insertion space 160. Hereinafter, descriptions that are the same as those of the configuration described with reference to FIG. 1 will be omitted.

The PCB 11 performs a function of electronically integrating various components that collect information of the aerosol generating device 10 while communicating with the controller 110. The controller 110 and the display 150 may be fixedly mounted on the surface of the PCB 11, and the battery 120 supplies power to elements connected to the PCB 11.

The display 150 is a device that outputs information as visual information among information generated by the aerosol generating device 10, and may include an LCD panel (or LED panel) provided on a front side of the aerosol generating device 10 that outputs the visual information based on information received from the controller 110.

The cigarette insertion space 160 refers to a space that is recessed to a predetermined depth toward the inside of the aerosol generating device 10 so that the cigarette 200 is able to be inserted. The cigarette insertion space 160 has a cylindrical form like a stick-shape of a cigarette (e.g. cigarette 200 or double medium cigarette 300) so that the cigarette is stably mounted, and the height (depth) of the cigarette insertion space 160 may vary depending on the length of the region of the cigarette containing the aerosol-generating material.

For example, if the double medium cigarette 300 described in FIG. 6 is inserted into the cigarette insertion space 160, the height of the cigarette insertion space 160 may be equal to the sum of the lengths of the aerosol base portion 310 and the medium portion 320. When the cigarette 200 is inserted into the cigarette insertion space 160, an aerosol may be generated as the heater 130 adjacent to the cigarette insertion space 160 is heated. The controller 110 may implement a smart-on function to start supplying power to the heater 130 by detecting that the cigarette compatible with the aerosol generating device 10 is inserted, and the aerosol generating device 10 according to an embodiment of the present disclosure may additionally include an inductance channel and a capacitance channel in order to stably implement the smart-on function. Hereinafter, the inductance channel and the capacitance channel are collectively referred to as a passive component channel.

FIG. 9 is a diagram illustrating an example of the cigarette insertion space and a passive component channel of FIG. 7 in detail.

For convenience of explanation, in FIG. 9, elements other than the heater 130, the cigarette insertion space 160, a first channel 910, and a second channel 930 are omitted, and the first channel 910 and second channel 930 may be collectively or respectively referred to as a passive component channel.

The heater 130 is between the cigarette insertion space 160 and the first channel 910 or between the cigarette insertion space 160 and the second channel 930, and heats the cigarette inserted in the cigarette insertion space 160. In detail, in the aerosol generating device 10, to which the smart-on function is added, when the cigarette is inserted into the cigarette insertion space 160, an aerosol is generated through sequential operations. For example, the sequential operations may include the passive component channel (such as the first channel 910 and the second channel 930) detecting that the cigarette has been inserted and transmitting a signal indicating detection to the controller 110, and in response to the signal, the controller 110 controls power to be supplied to the heater 130 to generate an aerosol.

The cigarette insertion space 160 is a cylindrical space in which the cigarette may be inserted. The cigarette insertion space 160 is a space recessed in the surface of the aerosol generating device 10, and is not a member made of an existing material, but for convenience of explanation, assuming that the cigarette insertion space 160 is an arbitrary cylindrical member, it may be seen that the heater 130 in FIG. 9 is disposed in a form surrounding the outer circumferential surface of the cigarette insertion space 160. In order to uniformly heat the medium portion of the cigarette 200 inserted in the cigarette insertion space 160, the heater 130 may be of a tube type including a hollow inside as shown in FIG. 9, and according to the embodiment, it may be implemented in a form that surrounds only a part of the outer peripheral surface of the cigarette insertion space 160.

The first channel 910 is a passive component channel and is closest to the end of the cigarette inserted into the cigarette insertion space 160. For example, when the double medium cigarette 300 shown in FIG. 6 is inserted into the cigarette insertion space 160, the aerosol base portion 310 is located closest to the first channel 910. When the aerosol generating device 10 is erected as shown in FIG. 8, the first channel 910 may be positioned further below (downstream) than the second channel 930, and may include at least one of an inductance channel and a capacitance channel. When there is an object approaching the cigarette insertion space 160, the first channel 910 detects the approach of the object as a changing physical characteristic and transmits a signal indicating the physical characteristic to the controller 110. As shown in FIG. 9, the first channel 910 is a tubular type that surrounds the heater 130 and includes a hollow therein, and additional characteristics of the first channel 910 will be described with reference to FIG. 10.

The second channel 930 is also a passive component channel, and is located higher (upstream) than the first channel 910. For example, when the double medium cigarette 300 shown in FIG. 6 is inserted into the cigarette insertion space 160, the medium portion 320 is located closest to the second channel 930. The second channel 930 may include at least one of the inductance channel and the capacitance channel, and when there is an object approaching a portion of cigarette insertion space 160 in the first channel 910, the first channel 910 detects the approach of the object as a changing physical characteristic and transmits a signal indicating the physical characteristic to the controller 110. As shown in FIG. 9, the second channel 930 is a tubular type that surrounds the heater 130 and includes a hollow therein, and structural characteristics of the second channel 930 will be described later with reference to FIG. 10.

The aerosol generating device 10 according to an embodiment of the present disclosure has a configuration for implementing a smart on function, and includes each of the inductance channel and the capacitance channel.

First, the inductance channel is a passive component channel including a coil composed of a predetermined number of windings, a winding direction, and a material. In the inductance channel, even when the aerosol generating device 10 is not generating an aerosol, an alternating current having a preset frequency flows in order to implement the smart-on function. The cigarette used in the aerosol generating device 10 may include a metal foil to increase the thermal conductivity of the aerosol generating material, and the frequency of the current flowing through the inductance channel may be changed by the metal foil of the cigarette. When a change occurs in the frequency of the current flowing through the inductance channel and an amount of the change exceeds a first reference range because the object adjacent to the cigarette insertion space 160 is a magnetic material, the controller 110 detects the amount of change in the frequency of the inductance channel and subsequently controls the capacitance channel to start measuring capacitance so that an amount of change in the capacitance of the capacitance channel is measured.

The capacitance channel is a passive component channel that is connected to electrodes at both ends of a part of the cigarette insertion space 160, measures capacitance from the electrodes, and transmits a signal indicating a measured capacitance value to the controller 110. When the controller 110 determines that the amount of frequency change of the inductance channel exceeds the first reference range, the capacitance channel measures capacitance through electrodes positioned at both ends of a part of the cigarette insertion space 160 and transmits a signal indicating the measured capacitance to the controller 110. The controller 110 calculates a difference between a normal capacitance and the measured capacitance, and when it is determined that the difference exceeds a second reference range, the controller 110 transmits a control signal to the battery 120 so that power is supplied to the heater 130. The controller 110 may determine whether to start supplying power to the heater 130 by storing the first reference range and the second reference range in advance or receiving the first reference range and the second reference range from a memory.

$$C = \varepsilon_0 \varepsilon_r \frac{A}{d} \qquad \text{[Math. 1]}$$

Math FIG. 1 (Equation 1) is an equation for the capacitance measured in the capacitance channel. In Equation 1, C is the capacitance measured by the capacitance channel (calculated capacitance value), $\varepsilon_0$ is $8.85*10^{-12}$, which is the permittivity in vacuum, $\varepsilon_r$ is the relative permittivity of the dielectric, A is the area of the electrode, and d is the distance between electrodes, respectively.

In particular, $\varepsilon_r$ is a value that varies depending on the object positioned between the two electrodes connected to the capacitance channel. When the cigarette is inserted into the cigarette insertion space 160, compared to the case where a general magnetic material is inserted into the cigarette insertion space 160, the amount of change in capacitance measured in the capacitance channel is relatively large due to the moisturizing agent or moisture in the cigarette as an aerosol-generating material.

When the smart-on function is implemented by including only the inductance channel in an aerosol generating device, the controller detects that the cigarette is inserted into the cigarette insertion space of the aerosol generating device and supplies power to the heater. However, when the magnetic material causing the frequency change of the inductance channel is accidentally inserted into the cigarette insertion space or when the inductance channel is close enough to cause a change in the frequency of the flowing current even if the magnetic material is not inserted into the cigarette insertion space, there is a problem in that the smart-on function malfunctions.

The aerosol generating device 10 according to an embodiment of the present disclosure solves the problem of malfunction of the smart-on function by providing both the inductance channel and the capacitance channel. In detail, in the aerosol generating device 10 according to an embodiment of the present disclosure, even if a frequency change is detected by the inductance channel, if the capacitance change amount from the capacitance channel is not satisfied, it is considered that the cigarette suitable for the aerosol generating device 10 is not inserted, and the smart-on function is not activated.

That is, because the aerosol generating device 10 according to an embodiment of the present disclosure includes an additional capacitance channel as a preventive measure, the smart-on function is not activated when the cigarette is not inserted into the cigarette insertion space 160. Therefore, an accident due to overheating of the heater 130 in a state in which the user does not recognize the malfunction of the smart-on function may be fundamentally prevented from occurring.

Depending on the embodiment, the capacitance channel may measure the capacitance first and transmit the measured capacitance to the controller 110 in a state in which it is not determined that the frequency change amount exceeds the first reference range by the inductance channel. In addition, in another embodiment, the controller 110 may check the frequency change amount of the inductance channel after checking that the change amount of the capacitance exceeds the second reference range.

In FIG. 9, the first channel 910 and the second channel 930 are passive component channels and may be at least one of the inductance channel and the capacitance channel. In an embodiment of the present disclosure, at least one inductance channel and capacitance channel is required in a form adjacent to the cigarette insertion space 160, and when there is a first channel 910 and a second channel 930 as shown in FIG. 9, they may be arranged as shown below in Table 1.

TABLE 1

| case number | first channel | second channel |
|---|---|---|
| 1 | inductance channel | capacitance channel |
| 2 | inductance channel | inductance channel & capacitance channel |
| 3 | capacitance channel | inductance channel |
| 4 | capacitance channel | inductance channel & capacitance channel |
| 5 | inductance channel & capacitance channel | inductance channel |
| 6 | inductance channel & capacitance channel | capacitance channel |
| 7 | inductance channel & capacitance channel | inductance channel & capacitance channel |

Table 1 is a table showing the number of cases of arrangement for passive component channels that may be arranged in the first channel 910 and the second channel 930. Referring to Table 1, when channels are divided into a first channel 910 and a second channel 930 as shown in FIG. 9, it may be seen that the inductance channel and the capacitance channel may be arranged according to one of the seven cases. An embodiment in which the inductance channel and the capacitance channel are arranged in the same channel will be described later with reference to FIGS. 11 and 12.

FIG. 10 is a cross-sectional view of the cigarette insertion space described in FIG. 9.

In detail, FIG. 10 is a diagram schematically illustrating the boundary between the heater 130, the cigarette insertion space 160, and the passive component channel described in FIG. 9. FIG. 10 is a cross-sectional view of a structure in which a heater 130 and a passive component channel are combined in a vertical direction in a direction in which an aerosol moves, when an aerosol is generated from the cigarette 200 and is inhaled by a user.

A first circle 1010, which is a circle located in the center of FIG. 10 and has the smallest diameter, is the appearance when the cigarette insertion space 160 is observed from above.

A first ring 1030 in the form surrounding the first circle 1010 is a form that appears when the cross-section of the heater 130 described in FIGS. 7 to 9 is observed from above.

A second ring 1050 in the form surrounding the first ring 1030 represents a gap or material between the first ring 1030 and a third ring 1070. The second ring 1050 represents a space or material provided to prevent damage to the passive component channel by heat of the heater 130 when the heater 130 is heated. The second ring 1050 may be made of a material having very low thermal conductivity, such as an insulating material.

The third ring 1070 has a form surrounding the second ring 1050 and shows a cross-section of the passive component channel in FIG. 9. In detail, because the second channel 930 is above the first channel 910 in FIG. 9, the third ring 1070 may be one of the first channel 910 or the second channel 930 according to the height of the cross-section in FIG. 10.

FIG. 11 is a diagram schematically showing an example of an arrangement of a passive component channel.

FIG. 11 is a cross-sectional view of a combination of the heater 130, the cigarette insertion space 160, the first channel 910, and the second channel 930 described with reference to FIG. 9, and in detail, schematically shows case number 7 in Table 1. For convenience of explanation, it is assumed that the cigarette 200 includes two medium portions, as in the double medium cigarette 300 described with reference to FIG. 6, and a gap (or material) between the heater 130 and the passive component channel described with reference to FIG. 10 is omitted.

In FIG. 11, as shown in FIG. 9, a passive component channel is composed of two layers, the cigarette 200 is inserted into the cigarette insertion space 160, and the heater 130 is divided into a first heater 131 and a second heater 133.

The first channel 910 is composed of an inductance channel and a capacitance channel, and is adjacent to the first heater 131. The first heater 131 may be a susceptor capable of increasing the temperature of a first medium portion 291 of the cigarette 200 by being heated by a coil of the inductance channel constituting the first channel 910. The configuration ratio of the inductance channel and the capacitance channel constituting the first channel 910 may vary according to embodiments.

The second channel 930 is also composed of the inductance channel and the capacitance channel, and is adjacent to the second heater 133. The second heater 133 may be a susceptor capable of increasing the temperature of a second medium portion 293 of the cigarette 200 by being heated by a coil of the inductance channel constituting the second channel 930. The configuration ratio of the inductance channel and the capacitance channel constituting the second channel 930 may vary according to embodiments.

A filter unit 295 of the cigarette 200 is a part that the user directly contacts to inhale the aerosol, and is shown briefly in FIG. 11, but may be divided into a cooling region and a filter region.

To summarize FIG. 11, the cigarette includes two different mediums, there are two heaters for heating the two mediums to different temperatures, and two layers of passive component channels are arranged in the form surrounding each heater. Because the media included in the first medium portion 291 and the second medium portion 293 are different from each other, the controller 110 may subdivide and set a second reference range for comparison with the capacitance measured in each layer.

FIG. 12 is a cross-sectional view of the cigarette insertion space described with reference to FIG. 11.

In detail, FIG. 12 is a diagram schematically illustrating the boundary between the heater 130, the cigarette insertion space 160, and the passive component channel described with reference to FIG. 11. FIG. 12 shows a cross-sectional view taken in a vertical direction in a direction in which an aerosol moves, when the aerosol is generated from the cigarette 200 and is inhaled by a user.

A first circle 1210, which is a circle located in the center of FIG. 12 and has the smallest diameter, is the appearance when the cigarette insertion space 160 of FIG. 11 is observed from above.

A first ring 1230 appears as surrounding the first circle 1210 when the heater 130 is observed from above. In the cross-sectional view as shown in FIG. 12, the heater 130 is a ring form having a constant thickness that is empty inside so as to surround the outer circumferential surface of the cigarette insertion space 160, and the first ring 1230 may be either the first heater 131 or the second heater 133 depending on the height of the cross-section.

The second ring 1250 in the form surrounding the first ring 1230 represents a gap or material between the first ring 1230 and a third ring that includes inductance and capacitance channels (e.g. inductance channels 1271 and 1275 and capacitance channels 1273 and 1277). When the heater 130 is heated, the second ring 1250 is a form that appears when a space or material provided to prevent damage to the passive element channel by the heat of the heated heater 130 is observed from above. The second ring 1250 may be made of a material having extremely low thermal conductivity, such as an insulating material.

A channel boundary point 1270 represents the boundary points between inductance channels 1271 and 1275 and capacitance channels 1273 and 1277, which will be described later. The inductance channels 1271 and 1275 and the capacitance channels 1273 and 1277 may constitute a third ring that includes four of the channel boundary point 1270 as shown in FIG. 12. However as the number of inductance channels and the number of capacitance channels increases (or decreases), the number of boundary points may also increase (or decrease). For example, unlike FIG. 12, when there is one inductance channel and one capacitance channel, there may be two channel boundary points 1270. As illustrated in FIG. 12, the channel boundary points 1270 may be implemented as an interval for separating different passive component channels, and may be implemented as partition walls made of a material depending on embodiments.

In FIG. 12, in order to implement the smart-on function, an alternating current flows through the inductance channels 1271 and 1275, and the capacitance channels 1273 and 1277 are between the inductance channels 1271 and 1275. When an object is inserted into the first circle 1210, which is the cigarette insertion space, the capacitance sensed by the capacitance channels 1273 and 1277 varies, and the amount of change in frequency of the current of the inductance channels 1271 and 1275 and the amount of change in the capacitance of the capacitance channels 1273 and 1277 are collected by the controller and used to execute the smart-on function. As shown in FIG. 12, the inductance channels 1271 and 1275 and the capacitance channels 1273 and 1277 may be disposed not to be continuous with the channel boundary point 1270 therebetween.

FIG. 12 is a diagram for explaining that not only may the passive component channel be implemented in a multi-layered form in an embodiment of the present disclosure, but types of passive component channels included in each layer are also various ones, and it will be apparent to those of ordinary skill in the art that the number and types of passive component channels implemented in the aerosol generating device 10 are not limited to those described with reference to FIGS. 9 to 12.

FIG. 13 is an example of a graph showing a change in frequency detected by an inductance channel.

Referring to FIG. 13, it may be seen that the AC current flowing through the inductance channel has a constant frequency during a first time period 1310, a second time period 1330, and a third time period 1350. A frequency change occurs at 6.2 seconds, and returns to a normal frequency at 12.4 seconds. The controller 110 of the aerosol generating device 10 according to an embodiment of the present disclosure monitors a change in the AC current flowing through the inductance channel and determines whether a frequency change amount exceeding the first reference range is detected. FIG. 13 is a diagram for explaining mainly the frequency change, and in FIG. 13, it is assumed that there is no change in a current magnitude.

In an embodiment of the present disclosure, it is not determined whether to start power supply to the heater 130 only by the amount of frequency change in the inductance channel. Accordingly, with reference to FIG. 3, even if a frequency change exceeding the first reference range is detected by the controller 110 after 6.2 seconds, power supply to the heater 130 is not immediately started by the controller 110 due to the detection.

FIG. 14 is another example of a graph showing a change in frequency detected by an inductance channel with respect to a first time period 1410, a second time period 1430, and a third time period 1450.

When the inductance channel of FIG. 13 measures the maximum and minimum values vibrating in a sinusoidal current and transmits the maximum and minimum values to the controller 110, the inductance channel of FIG. 14 may be distinguished in that the inductance channel of FIG. 14 is provided with an inductive digital converter (LDC) sensor, and immediately determines a change in frequency (angular frequency) of the AC current and transmits the change in frequency to the controller 110. Because the vertical axis of FIG. 14 is not a current value but a frequency value (unit is Hz or rad/s), compared with FIG. 13, it may be seen that FIG. 14 is a graph of a step function rather than a sine function. According to an embodiment, an LDC sensor may determine whether the amount of change in frequency exceeds the first reference range based on an interrupt, and may directly transmit the determined result to the controller 110.

FIG. 15 is an example of a graph showing a change in capacitance sensed by a capacitance channel.

In FIG. 15, in the second time period 1430 starting at 6.2 seconds, the capacitance channel senses a capacitance change and calculates the capacitance change amount ΔC, but the controller 110 determines that the measured capacitance change does not reach the second reference range, and does not start supplying power to the heater 130.

On the other hand, in the third time period 1450 starting at 12.4 seconds, the capacitance channel once again detects a change in capacitance, and the controller 110 determines that the measured capacitance change AC exceeds the second reference range, and starts supplying power to the heater 130. It has already been described that the second reference range may be stored in advance in the controller 110 like the first reference range, and is described as a range to indicate a comprehensive meaning, but may be a constant value according to embodiments.

FIG. 16 is a flowchart sequentially showing a process of operating the aerosol generating device according to an embodiment of the present disclosure.

Because the method according to FIG. 16 may be implemented by the aerosol generating device 10 described with reference to FIGS. 1 to 15, descriptions previously provided are omitted.

In operation 51610, the controller 110 detects an amount of change in frequency of the current flowing through the inductance channel, and in operation S1620, determines whether the change in frequency exceeds a first reference range (e.g. first reference value).

When the amount of change in frequency exceeds the first reference range in operation S1620, the controller 110 controls the capacitance channel to measure the amount of change in capacitance in operation S1630.

The controller 110 determines whether the capacitance change amount exceeds the second reference range (e.g. second reference value) based on the value received from the capacitance channel in operation S1640, and if the capacitance change amount exceeds the second reference range, the controller 110 starts supplying power to the heater 130 in operation S1650.

The embodiments described in the present disclosure are example embodiments and do not limit the scope of the present disclosure in any way. For brevity of the specification, descriptions of existing electronic configurations, control systems, software, and other functional aspects of the systems may be omitted. Connections of lines or connection members between components illustrated in the drawings illustratively show functional connections and/or physical or circuit connections and may be represented as alternative or additional various functional connections, physical connections, or circuit connections in an actual device. Unless specifically mentioned, such as "essential", "importantly", etc., the components may not be necessary components for application of embodiments of the present disclosure.

As used herein (in particular, in claims), use of the term "the" and similar indication terms may correspond to both singular and plural. When a range is described in the present disclosure, the present disclosure may include embodiments to which individual values belonging to the range are applied (unless contrary description), and each individual value constituting the range is the same as being described in the detailed description of the disclosure. Unless there is an explicit description of the order of the steps constituting a method according to the present disclosure or a contrary description, the steps may be performed in an appropriate order. Embodiments of the present disclosure are not necessarily limited to the description order of steps. The use of all examples or example terms (for example, etc.) is merely for describing the present disclosure in detail, and the scope of the present disclosure is not limited by the examples or the example terms. It will be understood by one of ordinary skill in the art that various modifications, combinations, and changes may be made to the embodiments of the present disclosure.

INDUSTRIAL APPLICABILITY

An embodiment of the present disclosure may be used to manufacture a next-generation electronic cigarette device.

The invention claimed is:

1. An aerosol generating device comprising:

a heater configured to heat a cigarette to generate an aerosol;

an inductance channel;

a capacitance channel; and a controller configured to generate a control signal using information received from the inductance channel and the capacitance channel, wherein a cigarette insertion space that is configured to receive the cigarette is provided within the aerosol generating device, and the controller is configured to:

measure an amount of change in capacitance in the capacitance channel based on an amount of change in frequency of current flowing through the inductance channel exceeding a first reference value, due to an object adjacent to the cigarette insertion space, and control a start of a supply of power to the heater based on the amount of change in the capacitance that is measured exceeding a second reference value.

2. The aerosol generating device of claim 1, wherein at least one from among the inductance channel and the capacitance channel is adjacent to the cigarette insertion space.

3. The aerosol generating device of claim 1, wherein the cigarette insertion space has a cylindrical shape such as to be configured to receive a part of the cigarette to be heated by the heater, and the inductance channel and the capacitance channel are arranged to surround an outer circumferential boundary of the cigarette insertion space.

4. The aerosol generating device of claim 3, wherein at least one of the inductance channel and the capacitance channel is in a circumferential direction of the cigarette insertion space.

5. The aerosol generating device of claim 1, wherein the heater is a susceptor that is configured to be heated depending on a change of the current.

6. The aerosol generating device of claim 1, wherein the heater comprises a first heater and a second heater that are arranged along a height of the cigarette insertion space, and the controller is configured to cause the first heater and the second heater to heat at different temperatures from each other.

7. The aerosol generating device of claim 6, wherein the inductance channel and the capacitance channel are positioned to correspond to the first heater and the second heater, respectively.

8. The aerosol generating device of claim 1, wherein the inductance channel is an inductive digital converter (LDC) sensor, the LDC sensor is configured to generate an interrupt, and the controller is configured to determine that the amount of change in the frequency exceeds the first reference value based on the interrupt.

9. The aerosol generating device of claim 1, wherein the capacitance channel is configured to output a signal indicating the capacitance that varies depending on the object inserted into the cigarette insertion space, between two electrodes arranged at respective ends of the cigarette insertion space, and the controller is configured to, based on a difference between the capacitance and a preset reference value exceeding the second reference value, start supplying the power to the heater.

10. An aerosol generating device comprising:

a heater configured to heat a cigarette to generate an aerosol;

an inductance channel;

a capacitance channel; and a controller configured to generate a control signal using information received from the inductance channel and the capacitance channel;

wherein a cigarette insertion space that is configured to receive the cigarette is provided within the aerosol generating device, and the controller is configured to control a start of a supply of power to the heater based on an amount of change in capacitance that is measured exceeding a second reference value in a case where an amount of change in a frequency of current flowing through the inductance channel by an object adjacent to the cigarette insertion space exceeds a first reference value.

11. The aerosol generating device of claim 10, wherein the cigarette insertion space has a cylindrical shape such as to be configured to receive a part of the cigarette to be heated by the heater, and the inductance channel and the capacitance channel are arranged to surround an outer circumferential boundary of the cigarette insertion space.

12. The aerosol generating device of claim 10, wherein at least one of the inductance channel and the capacitance channel is in a circumferential direction of the cigarette insertion space.

13. The aerosol generating device of claim 10, wherein the heater is a susceptor that is configured to be heated depending on a change of the current.

14. The aerosol generating device of claim 10, wherein the heater comprises a first heater and a second heater that are arranged along a height of the cigarette insertion space, the controller is configured to cause the first heater and the second heater to heat at different temperatures from each other, and the inductance channel and the capacitance channel are positioned to correspond to the first heater and the second heater, respectively.

15. The aerosol generating device of claim 10, wherein the inductance channel is an inductive digital converter (LDC) sensor, the LDC sensor is configured to generate an interrupt, and the controller is configured to determine that the amount of change in the frequency exceeds the first reference value based on the interrupt.

* * * * *